United States Patent
Mieda et al.

[11] Patent Number: 5,987,737
[45] Date of Patent: Nov. 23, 1999

[54] GATE BREAK DEVICE AND GATE BREAK METHOD

[75] Inventors: Hiroki Mieda; Junzi Sakakibara; Takehiko Ikegami, all of Tokyo, Japan

[73] Assignees: Mitsubishi Denki Kabushiki Kaisha; Mitsubishi Electric Engineering Co., Ltd., both of Tokyo, Japan

[21] Appl. No.: 08/568,425

[22] Filed: Dec. 6, 1995

[30] Foreign Application Priority Data

Jul. 25, 1995 [JP] Japan .................................. 7-189318

[51] Int. Cl.⁶ .................................................. H01R 43/00
[52] U.S. Cl. ............................ 29/827; 225/97; 225/103; 225/104; 29/418
[58] Field of Search ..................... 257/678, 686; 29/418, 841; 225/2, 97, 103, 104

[56] References Cited

U.S. PATENT DOCUMENTS

| | | | |
|---|---|---|---|
| 4,560,880 | 12/1985 | Petric et al. | 250/441.1 |
| 4,954,307 | 9/1990 | Yokoyama | 264/272.15 |
| 5,044,912 | 9/1991 | Billings et al. | 425/116 |
| 5,374,021 | 12/1994 | Kleinman | 248/362 |
| 5,498,942 | 3/1996 | Ijuin | 318/567 |

FOREIGN PATENT DOCUMENTS

| | | |
|---|---|---|
| 2209460 | 10/1972 | Germany . |
| 5 326584 | 12/1993 | Japan . |
| 5 343454 | 12/1993 | Japan . |

*Primary Examiner*—Lee Young
*Assistant Examiner*—Kevin G Vereene
*Attorney, Agent, or Firm*—Oblon, Spivak, McClelland, Maier & Neustadt, P.C.

[57] ABSTRACT

A device and method for positioning a resin-sealed lead frame that includes semiconductor devices and resin for sealing the semiconductor devices on the lead frame. A break unit is provided for moving the resin-sealed lead frame to a break table. The break unit includes a vacuum suction portion to hold the resin-sealed lead frame during movement and to release it when the resin-sealed lead frame is brought into a receiving opening associated with the break table. The receiving opening is defined by a plurality of guides with the outer tip portions of the guides providing the receiving opening as a space larger than that occupied by the outer configuration of the resin-sealed lead frame. The guides have a slope to position the resin-sealed lead frame onto the break table after it is released in the receiving opening. The break unit further includes push down pins for pushing down and breaking off unwanted extra portions of resin from beneath the resin-sealed lead frame. The break table is further provided with notches which have shapes corresponding to the shapes of unwanted extra portions of resin of the resin-sealed lead frame.

7 Claims, 9 Drawing Sheets

GATE BREAK DEVICE AND GATE BREAK METHOD

BACKGROUND OF THE INVENTION

1. Field of the Invention

The present invention relates to a gate break device of a lead frame already sealed with resin, and a gate break method, and more particularly to a gate break device and a gate break method capable of shorten time required for gate break.

2. Description of the Background Art

In resin seal forming of lead frame, unnecessary parts such as cull, runner and gate are formed inevitably. It is the gate break device that is intended to remove such parts.

Figure 10:
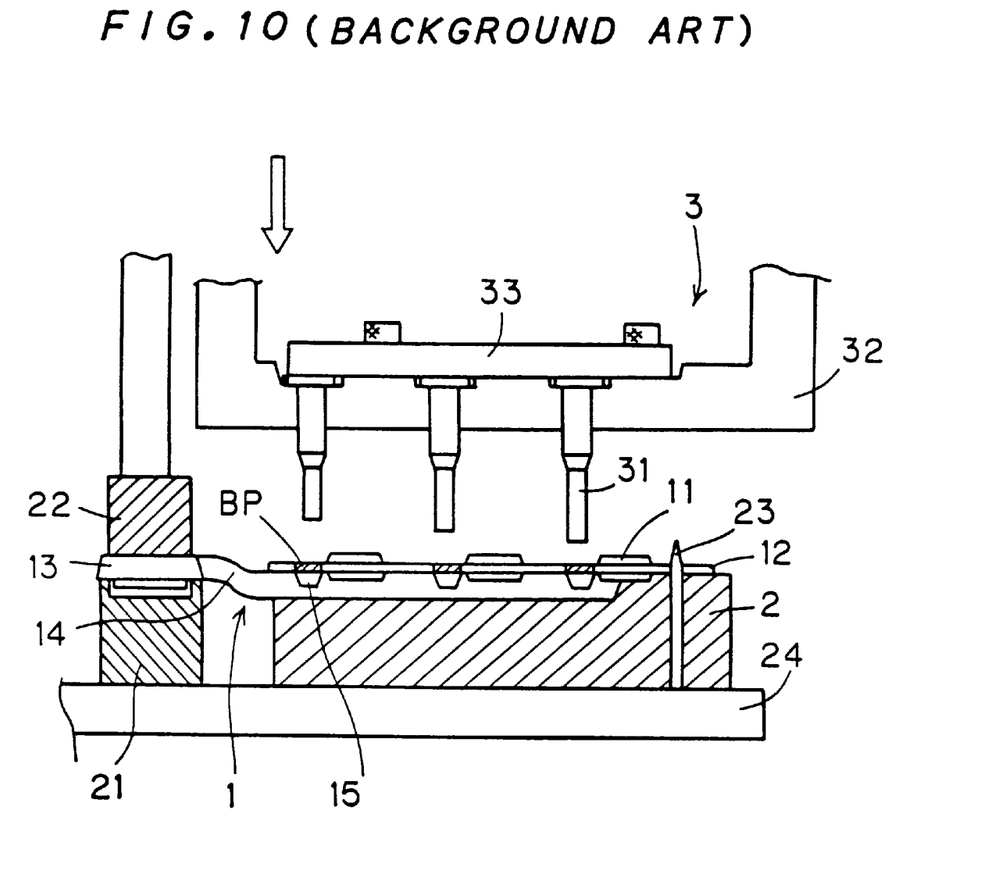
FIG. 10 is a diagram showing a step of gate break in a conventional gate break device.

FIG. 10 shows a constitution of a conventional gate break device. In FIG. 10, a resin-sealed lead frame 1 which are sealed and formed with resin is put on a break table 2. The resin-sealed lead frame 1 has unnecessary parts such as cull 13, runner 14, and gate 15, aside from a frame 12 comprising a semiconductor package 11, and the cull 13 is fixed between a cull cradle 21 and a cull holder 22. The resin-sealed lead frame 1 is restricted in position by plural positioning pins 23 provided vertically on the break table 2.

The break table 2 is put on a base table 24, and a break unit 3 is mounted on the break table 2.

The break unit 3 has plural break pins 31 disposed corresponding to the specified positions of the resin sealed lead frame 1, and the break pins 31 are fixed by a break pin mounting plate 32 and a break pin holding plate 33. The break pins 31 are designed so as to be longer at a position further from the cull 13.

Herein, the specified positions of the resin sealed lead frame 1 are break regions BP provided beforehand in the frame 12 for removing the cull 13. runner 14, and gate 15, generating indicating the upper part of the runner 14 near the gate 15, and an opening wider than the pin diameter of the break pin 31 is beforehand formed in the frame 12 of the corresponding part. By a step of resin seal forming, this opening is filled up with the resin, but as seen from the break pin 31 side, it is recognized as the exposed region of resin surface in a shape of the opening in the surface of the frame 12.

Figure 11:
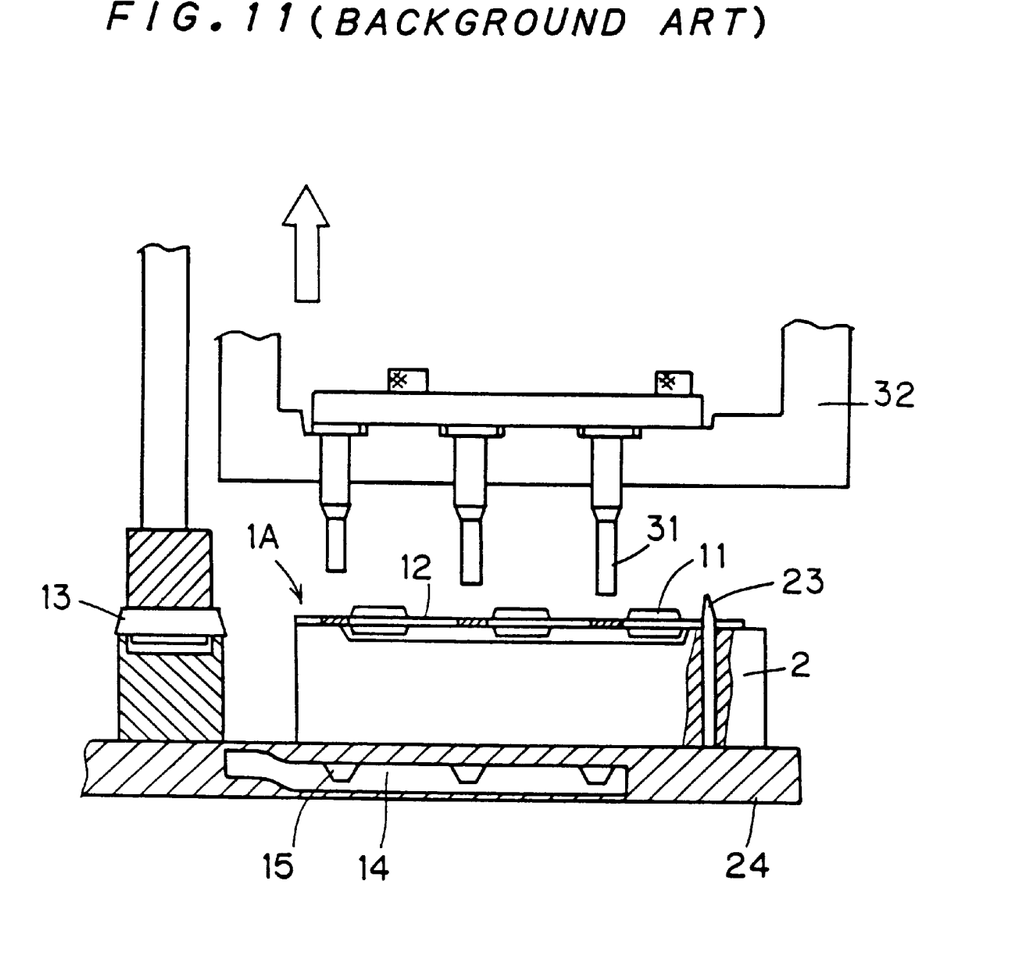
FIG. 11 is a diagram showing a step of gate break in a conventional gate break device.

Referring now to FIG. 10 and FIG. 11, the operation is described below. First, the resin-sealed lead frame 1 is transported from a resin sealing device which is not shown by a transporting device which is not shown, and is put on the break table 2, and at this time, by inserting a positioning pin 23 into a positioning hole preliminarily formed in the frame 12 of the resin-sealed lead frame 1, the position of the resin-sealed lead frame 1 is restricted.

Once the position of the lead frame 1 is determined, the cull 13 is positioned above the cull cradle 21, and the cull holder 22 descends, and the cull 13 is held and fixed by the cull cradle 21 and cull holder 22.

When fixing of the cull 13 is over, the break unit 3 begins to descend, and the break pin 31 at the remotest position from the cull 13 reaches the break region BP of the frame 12, and as it descends further, other break pins 31 sequentially reach the break region BP to push down the resin surface exposed on the surface of the frame 12, thereby peeling the gate 15 from the frame 12 and also peeling the runner 14.

After the gate 15 and runner 14 are peeled, when the break pins 31 are further lowered, since the cull 13 is fixed, the runner 14 is broken at the boundary of the runner 14 and cull 13, so that the gate 15 and frame 12 are separated from the lead frame 1.

Herein, the state after separation of the gate 15 and runner 14 is shown in FIG. 11. Notches are formed in the break table 2 and base table 24 in which the separated gate 15 and runner 14 drop, and the separated gate 15 and runner 14 are automatically put into a container which is not shown through the inside of the break table 2 and table base 24. On the other hand, the cull 3 is left over as being fixed by the cull cradle 21 and cull holder 22, and the semiconductor package 11 and frame 12 are left over on the break table 2.

The conventional gate break device is thus composed, and to mount the resin-sealed lead frame 1 on the break table 2, it was necessary to move the resin-sealed lead frame 1 to above the break table 2 by using a transporting device from the resin sealing device, and lower the resin-sealed lead frame 1 so as to insert the positioning pin 23 into the positioning hole provided preliminarily in the frame 12.

Therefore, aside from the break unit 3, a transporting device for transporting the resin-sealed lead frame 1 was needed. Herein, the configuration of the positioning pin 23 and positioning hole is strictly defined, and if the resin-sealed lead frame 1 is deviated when taking out from the resin sealing device or in the midst of transporting, the positioning pin 23 cannot be inserted into the positioning hole, and a high precision is required in the transporting device and the structure is complicated, the equipment cost increases, it takes a longer time in positioning the resin-sealed lead frame 1, and also a long time is needed in gate break.

The separated gate 15 and runner 14 are automatically put in the container by passing through the inside of the break table 2 and base table 24, but the cull 13 is left over on the cull cradle 21, and to process a next resin-sealed lead frame 1, a step and a mechanism for eliminating the cull 13 are needed, which adds to the cost of the equipment.

SUMMARY OF THE INVENTION

A first aspect of the invention relates to a gate break device for breaking connection of resin members provided in a resin-sealed lead frame, wherein the resin-sealed lead frame has a lead frame and semiconductor devices provided on the lead frame, the resin members includes package portions for sealing the semiconductor devices with resin, and extra portions formed together with the package portions under the lead frame, and the extra portions includes gates connected to the package portions under the lead frame, and runners connected to the gates under the lead frame, the gate break device comprising a break table for accepting the resin-sealed lead frame on the break table; and a break unit for breaking connections between the package portions and the extra portions, wherein the break unit has runner push-down means for pushing down the runners, vacuum suction means for sucking in vacuum the resin-sealed lead frame, and moving means for moving the runner push-down means and the vacuum suction means in horizontal and vertical directions, and wherein the break table has a plurality of frame guides each having a slope surface to accept the resin-sealed lead frame between the plurality of frame guides, and notch grooves are formed through the break table and having shapes corresponding to shapes of the extra portions of the resin members.

A second aspect of the invention relates to the gate break device of the first aspect of the invention, wherein the vacuum suction means has first suction means for sucking in vacuum the culls, and second suction means for sucking in vacuum the package portions.

A third aspect of the invention relates to the gate break device of the second aspect of the invention, wherein the first suction means has a flexible vacuum exhaust tube.

A fourth aspect of the invention relates to the gate break device of the first aspect of the invention, wherein the resin members further has a frame holder for pushing the lead frame toward the break table to restrict the resin-sealed lead frame in position, and the break table further has recesses for accepting the package portions without touching the package portions.

A fifth aspect of the invention relates to the gate break device of the first aspect of the invention, wherein the lead frame has circular holes, the runners have portions exposed upward through the holes, and the runner push-down means has push-down pins for pushing down the portions of the runners exposed.

A sixth aspect of the invention relates to the gate break device of the first aspect of the invention, wherein the lead frame has rectangular holes, the runners have portions exposed upward through the holes, and the runner push-down means has push-down pins for pushing down the portions of the runners exposed.

A seventh aspect of the invention relates to a method of breaking connection of resin members provided in a resin-sealed lead frame with a gate break device, wherein the resin-sealed lead frame has a lead frame and semiconductor devices provided on the lead frame, the resin members includes package portions for sealing the semiconductor devices with resin, and extra portions formed together with the package portions under the lead frame, and the extra portions includes gates connected to the package portions under the lead frame and runners connected to the gates under the lead frame, the gate break device comprises a break table for accepting the resin-sealed lead frame on the break table and a beak unit for breaking connections between the package portions and the extra portions, and wherein the break table has a plurality of frame guides each having a slope surface to accept the resin-sealed frame between the plurality of frame guides, and notch grooves are formed through the break table and having shapes corresponding to shapes of the extra portions of the resin members, the method comprising the steps of (a) sucking the resin-sealed lead frame with vacuum suction means and moving the resin-sealed lead frame to a space on a region surrounded by the plurality of frame guides; (b) releasing the resin-sealed lead frame from the vacuum suction means onto the break table along the slope surfaces of the break table; (c) moving the vacuum suction means onto the resin-sealed lead frame; and (d) pushing down the runners to break connections between the gates and the package portions, whereby the gates and the runners fall down through the notch grooves.

According to the gate break device of the first aspect of the invention, the resin-sealed lead frame can be moved by sucking in vacuum by the vacuum suction means, and the break unit comes to have the function of moving the resin-sealed lead frame horizontally by sucking in vacuum, and therefore it does not require conveying means for moving, for example, by taking out the resin-sealed lead frame from the resin sealing device. Moreover, since the frame guide is provided on the break table, by dropping the resin-sealed lead frame along the slope surface of the frame guide, positioning of the resin-sealed lead frame is achieved, and hence the time required for positioning is shortened, and the manufacturing efficiency of semiconductor device is enhanced and the manufacturing cost is reduced, while high moving precision is not demanded in the moving means of the break unit, the constitution is simplified, and the gate break device can be reduced in size. Still more, having notch grooves having shapes corresponding to shapes of extra portions, after peeling the runners and gates by the runner push-down means, the runners and gates drop by passing through the notch grooves, so that the runner, gates and culls can be removed at one time, and the time spent for gate break can be saved.

According to the gate break device of the second aspect of the invention, the vacuum suction means has first suction means and second suction means, and hence the resin-sealed lead frame can be moved securely, so that failure due to position deviation of the resin-sealed lead frame in moving can be prevented.

According to the gate break device of the third aspect of the invention, the first suction means for culls comprises a flexible vacuum exhaust tube, and if the cull is lifted when pushing down the runner, pressure is prevented from being applied to the cull, and therefore halfway peeling of gate or dropout of cull only which may occur when pressure is applied to the cull can be avoided.

According to the gate break device of the fourth aspect of the invention, when the resin-sealed lead frame is put on the break table, package portions are put into recesses without touching, and the lead frame position is restricted by the frame holder, and therefore the package portions are prevented from being deviated in position to contact with the break table when pushing down the runner, thereby avoiding damage of the package portions and enhancing the manufacturing yield of the semiconductor device.

According to the gate break device of the fifth aspect of the invention, the circular holes of the resin-sealed lead frame is pushed down by the runner push-down pins in the shape conforming to the shape of the circular holes, and therefore the runner and gate are peeled effectively, so that the manufacturing yield of the semiconductor device can be enhanced by reducing peeling failures.

According to the gate break device of the sixth aspect of the invention, the dimensional allowance of holes are increased, and by forming holes over plural gates and matching the runner push-down pin of the runner push-down means to the shape of square holes, the number of runner push-down pins can be curtailed, and the manufacturing apparatus of gate break device can be saved.

According to the gate break method of the seventh aspect of the invention, the resin-sealed lead frame can be easily positioned and mounted on the break table at step (a) and step (b), and the runner and gate are peeled in the state of restricting the position of the resin-sealed lead frame at steps (c) and step (d), so that the runner, gate and cull consecutive to the runner can be removed at once, and hence the positioning time is shortened, and the manufacturing efficiency of semiconductor device is enhanced and the manufacturing cost is reduced, and moreover since the runner, gate and cull consecutive to the runner can be removed at one time, the time spent for gate break is shortened.

It is therefore an object of the present invention to solve the problems of the prior art, and provide a gate break device comprising a moving function of a resin-sealed lead frame so as to lower the equipment cost and shorten the time required for gate break, and a gate break method suited to such gate break device.

These and other objects, features, aspects and advantages of the present invention will become more apparent from the following description of the present invention when taken in conjunction with the accompanying drawings.

DESCRIPTION OF THE PREFERRED EMBODIMENTS

Figure 1:
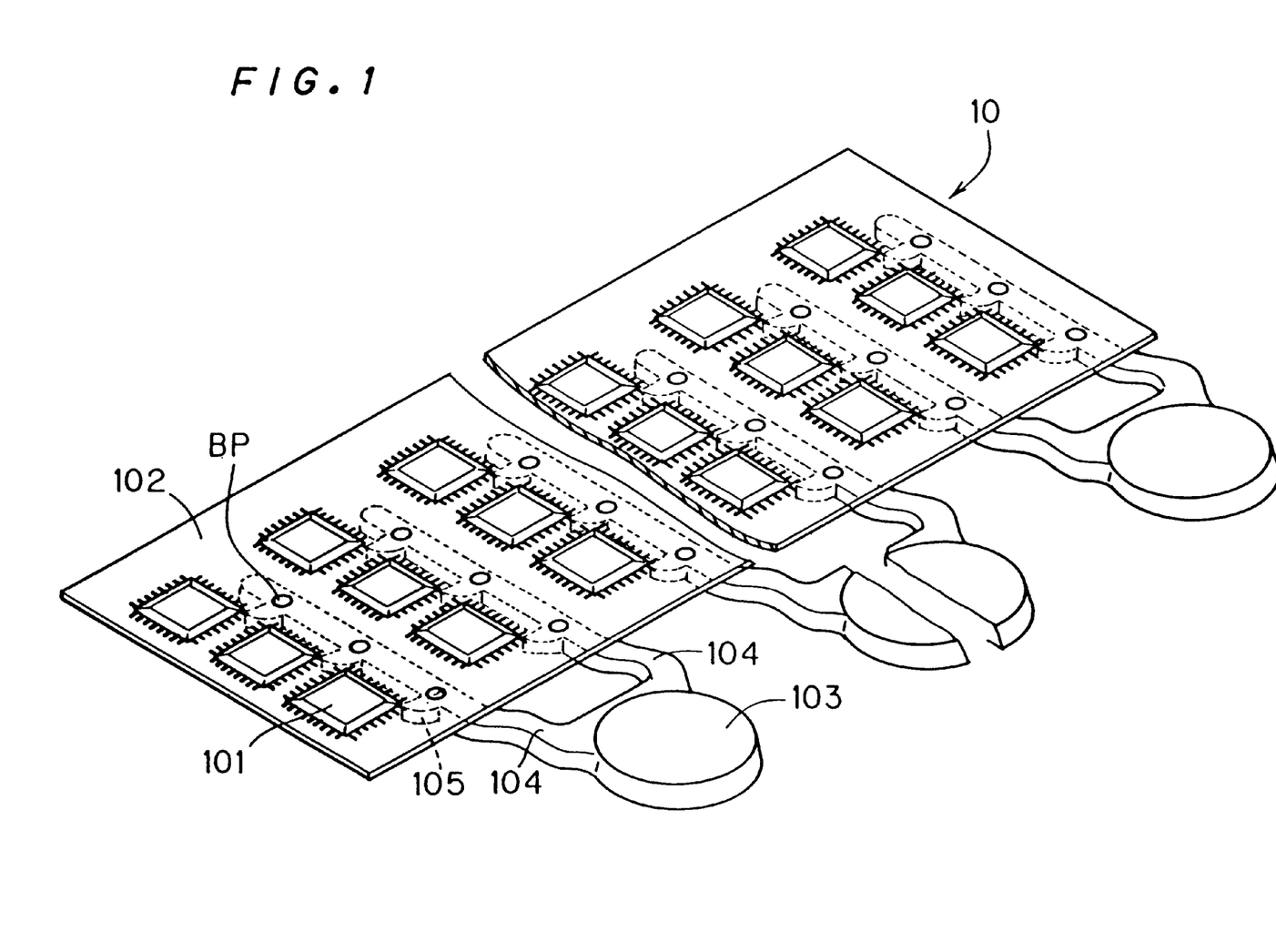
FIG. 1 is a perspective view showing a constitution of a resin-sealed lead frame suited to a gate break device of the invention.

A preferred embodiment of a gate break device of the invention is described in detail below while referring to FIG. 1 to FIG. 9. FIG. 1 is a perspective view showing a constitution of a resin-sealed lead frame 10 suited to a gate break device of the invention.

<A. Constitution of resin-sealed lead frame>

In FIG. 1, two runners 104 extending mutually parallel from two edges of a disk-shaped cull 103 contact with the lower surface of a frame 102. From the non-confronting sides of the two runners 104, three gates 105 are extending each, and the ends of the gates 105 are connected to a semiconductor package 101. Six semiconductor packages 101 are connected to two runners 104 extending from one cull 103. Such constitution is called, for example, a frame unit.

In the resin-sealed lead frame 10, multiple frame units are arranged parallel in the longer side direction of a rectangular frame 102, and plural semiconductor packages 101 are nearly arranged to form a so-called multi-row frame.

Herein, the runners 104 and gates 105 are the resin remaining in the resin route provided in the die when forming the semiconductor package 101 by sealing with resin the semiconductor integrated circuit formed on the frame 102, and are formed reflecting the shape of the resin route. The cull 103 is formed by the resin remaining at the resin inlet, and the cull 103, runners 104, gates 105, and semiconductor package 101 are formed in one body.

In the frame 102 positioned above the runners 104 near the gates 105, a hole wider than the pin diameter of the break pin is formed beforehand, and this hole is also filled by a step of resin sealing, and a circular resin region is exposed on the surface of the frame 102 after resin sealing. This is the break region BP.

<B. Constitution of break unit>

Figure 2:
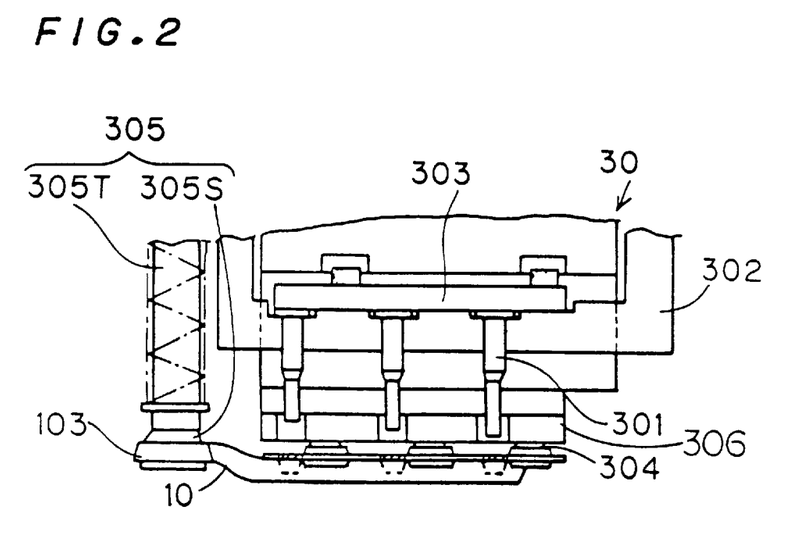
FIG. 2 is a diagram showing a constitution of a break unit of a gate break device of the invention.
Figure 3:
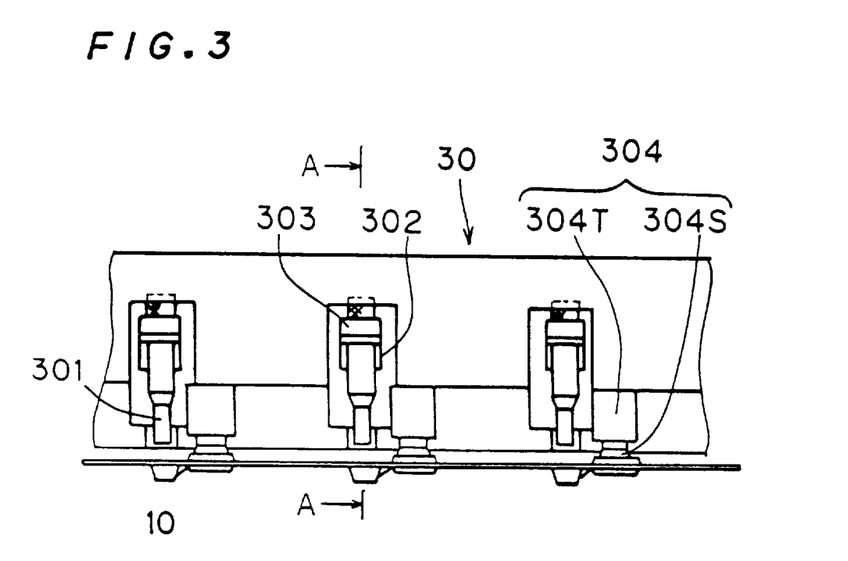
FIG. 3 is a diagram showing a constitution of a break unit of a gate break device of the invention.

Referring now to FIG. 2 and FIG. 3, the constitution of the break unit having transporting mechanism is described. FIG. 2 shows a break unit 30 in a transporting state of the resin-sealed lead frame 10. Meanwhile, FIG. 2 is a sectional view of a break unit 30 in the shorter side direction of the resin-sealed lead frame 10.

In FIG. 2, the break unit 30 comprises plural break pins 301 disposed corresponding to break regions BP of the resin-sealed lead frame 10, a suction pad for package 304 disposed corresponding to the semiconductor package 101, and plural suction pads for cull 305 disposed corresponding to individual culls 103 of the frame unit, and the break pins 301 are fixed by a break pin fitting plate 302 and a break pin pushing plate 303. There is also a frame holder 306 for fixing the frame 102.

The shape of the break pins 301 is columnar, and the one further from the cull 103 is designed to have a longer length. The length changing degree is determined so that the angle formed by a straight line linking the center of front ends of the break pins 301 and the horizontal plane may be about 6 to 8 degrees. In this constitution, the unpeeled portion of the gate 105 when breaking may be kept to a minimum limit.

Herein, the suction pad for package 304 and suction pad for cull 305 are both intended to suck the objects by vacuum suction, and comprise suction ports 304S and 305S for directly contacting with the objects, and vacuum tubes 304T and 305T connected to the suction ports. Although flexibility is not required in the vacuum tube 304T of the suction pad for package 304, flexibility in the tube longitudinal direction is required in the vacuum tube 305T of the suction pad for cull 305 due to the reason explained below, and hence a tube elastic in the longitudinal direction, for example, a corrugated tube is used.

The break unit 30 is designed to move not only in the up-down (vertical) direction, but also in the plane (horizontal) direction (moving mechanism is not shown), and therefore the resin-sealed lead frame 10 can be sucked to the suction pad for package 304 and suction pad for cull 305, and taken out of the resin sealing device not shown, and the resin-sealed lead frame 10 is moved parallel in the sucked state, and transported to a desired position of the gate break device.

FIG. 3 is a view of the break unit 30 in the transporting state of the resin-sealed lead frame 10 seen from a longitudinal direction opposite to the disposed side of the cull 103 of the resin-sealed lead frame 10.

In FIG. 2 and FIG. 3, the break pins 301 are known to be disposed corresponding to break regions BP of all frame units provided in the resin-sealed lead frame 10. FIG. 2 is a sectional view taken on line A—A in FIG. 3.

<C. Constitution of break table>

Figure 4:
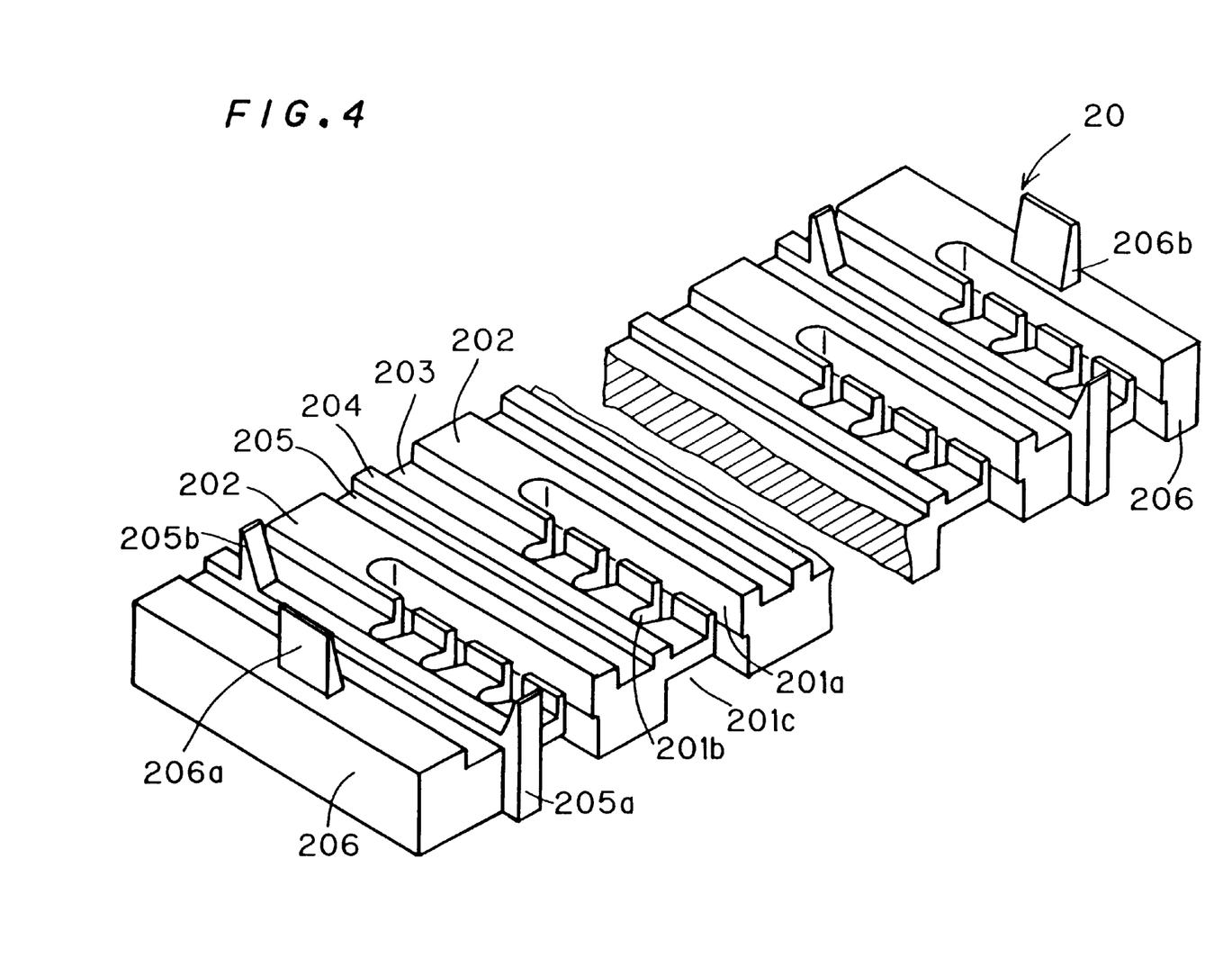
FIG. 4 is a diagram showing a constitution of a break table of a gate break device of the invention.

Referring next to FIG. 4, the constitution of the break table is described. FIG. 4 is a perspective view of the break table 20. The outside shape of the break table 20 is rectangular, and it comprises a notch groove for runner 201a and a notch groove for gate 201b conforming to the contour shape of the runner 104 and gate 105 of individual frame units of the resin-sealed lead frame 10.

Incidentally, FIG. 4 is a partial perspective view near both ends of the break table 20, other parts are omitted, but actually similar notch grooves for runner 201a and notch grooves for gate 201b are formed according to the number of frame units.

Herein, the notch grooves for runner 201a are provided along a first convex portion 202 extending in the shorter side direction of the break table 20, from the end to the middle of the shorter side direction of the break table 20, and the notch grooves for gate 201b are provided in a first concave portion 203 formed along the left side of the first convex portion 202.

A second convex portion 204 is formed along the left side of the first concave portion 203, and a second concave portion 205 is formed along the left side of the second convex portion 204. Also along the left side of the second concave portion 205, the first convex portion 202 is formed again, and thus the concave and convex portions are formed repeatedly on the break table 20.

Moreover, a notch 201c is formed in the break table 20 directly under the notch groove for runner 201a and notch groove for gate 201b, and the notch groove for runner 201a and notch groove for gate 201b are connected to the notch 201c.

When the resin-sealed lead frame 10 explained by referring to FIG. 1 is put on the break table 20, the runner 104 is inserted into the notch groove for runner 201a, and the gate 105 is positioned above the notch groove for gate 201b. The semiconductor package 101 is positioned over the first concave portion 203, second convex portion 204, and second concave portion 205. The height of the second convex portion 204 is formed lower than the first convex portion 202 so as not to contact with the major surface of the semiconductor package 101.

At the edge of the longer side of the break table 20 coming to the cull 103 side when the resin-sealed lead frame 10 is put on the break table 20, a longer side first frame guide 205a is formed so as to be connected to the second convex portion 204, and a longer side second frame guide 205b is formed on the second convex portion 204 at a specific interval opposite to the longer side first frame guide 205a.

The longer side first frame guide 205a and longer side second frame guide 205b have slope surfaces opened upward on the mutually confronting sides, and the lowest parts of the both slope surfaces, that is, the interval of the parts contacting with the upper surface of the second concave portion 204 is adjusted to the length of the shorter side of the frame 102, and the dimensional tolerance is determined so that position deviation may not occur when the resin-sealed lead frame 10 is put on.

On the shorter side edge 206 of the break table 20, a shorter side first frame guide 206a and a shorter side second frame guide 206b are formed. The shorter side first frame guide 206a and shorter side second frame guide 206b have slope surfaces opened upward on the mutually confronting surfaces, and the lowest parts of the both slope surfaces, that is, the interval of the parts contacting the shorter side edge of the break table 20 is adjusted to the length of the longer side of the frame 102, and the dimensional tolerance is determined so that position deviation may not occur when the resin-sealed lead frame 10 is put on.

<D. Operation of break unit>

Figure 5:
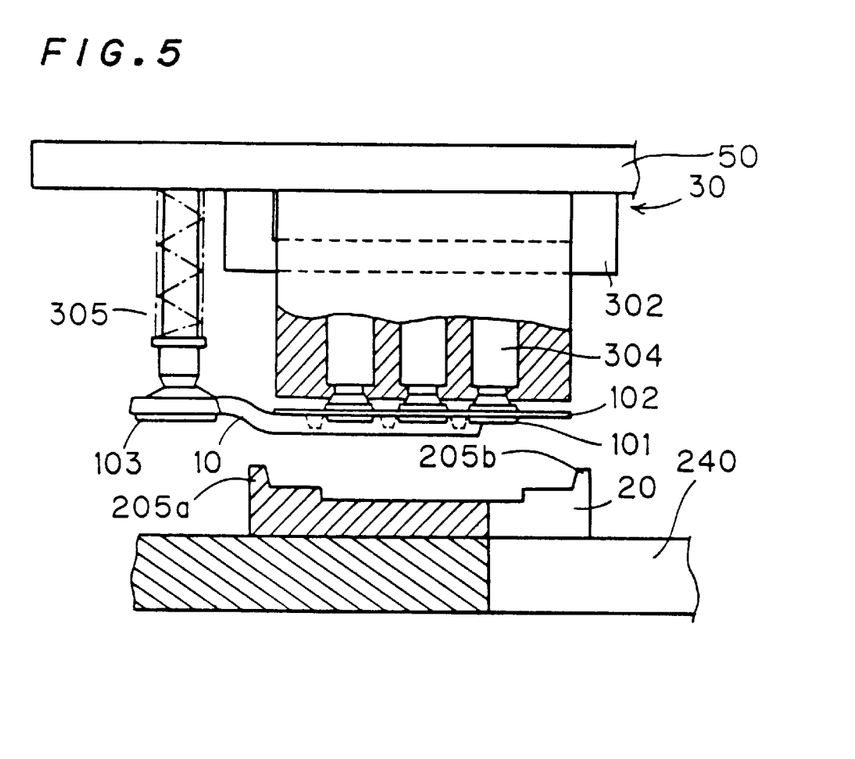
FIG. 5 is a diagram showing a step of gate break in a gate break device of the invention.
Figure 6:
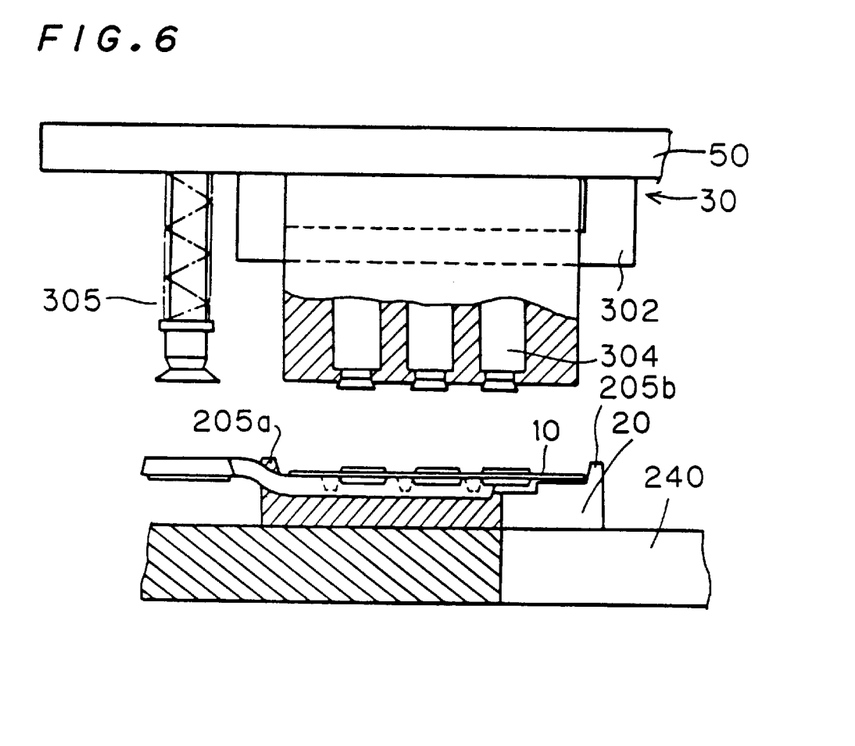
FIG. 6 is a diagram showing a step of gate break in a gate break device of the invention.
Figure 7:
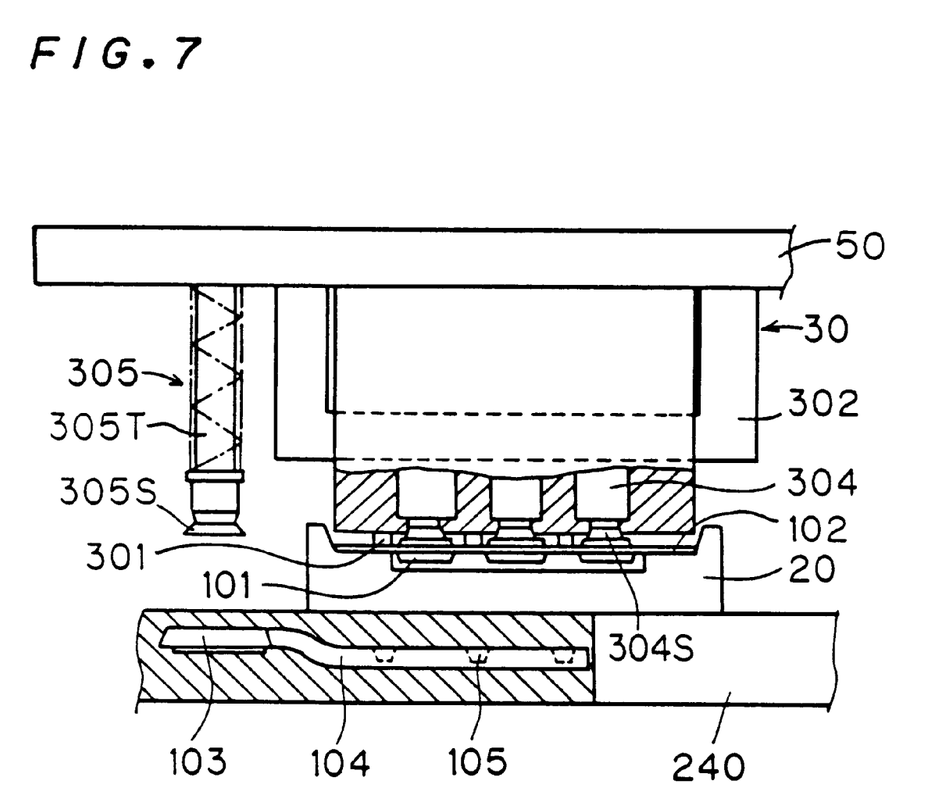
FIG. 7 is a diagram showing a step of gate break in a gate break device of the invention.

Referring to FIG. 5 to FIG. 7, the operation of the break unit 30 is described below. Herein, FIG. 5 to FIG. 7 are schematic views seeing the break unit 30 from the shorter side direction of the resin-sealed lead frame 10, and partially cut-away views are shown.

The break unit 30 taking out the resin-sealed lead frame 10 from the resin sealing device not shown by vacuum suction moves horizontally while sucking the resin-sealed lead frame 10, and reaches above the break table 20 of the gate break device as shown in FIG. 5. In FIG. 5, the break unit 30 is mounted on a moving plate 50, and the moving plate 50 is connected to the moving mechanism (not shown) for horizontal and vertical move, and the break unit 30 moves horizontally and vertically along the horizontal and vertical move of the moving plate 50.

In FIG. 5, the break table 20 is put on a base table 240. The base table 240 is notched at a position corresponding to the notch 201c linked with the notch groove for runner 201a and notch groove for gate 201b of the break table 20, and a position corresponding to the cull 103.

Herein, the resin-sealed lead frame 10 is disposed so that the cull 103 may comes to the side of the longer side first frame guide 205a, and that the frame 102 may nearly coincide with the region enclosed by the longer side first frame guide 205a, longer side second frame guide 205b, shorter side first frame guide 206a, and shorter side second frame guide 206b.

Next, as shown in FIG. 6, the resin-sealed lead frame 10 is dropped by cutting off the suction by the suction pad for package 304 and suction pad for cull 305.

In the drawing, the resin-sealed lead frame 10 is shown to drop from further above the frame guide, but actually, the lead frame 10 is moved closer to the frame guide, and then the suction is canceled.

The resin-sealed lead frame 10 reaches on the major surface of the break table 20 as the longer side falls along the slope surfaces of the longer side first frame guide 205a and longer side second frame guide 205b of the break table 20, and the shorter side, along the slope surfaces of the shorter side first frame guide 206a and shorter side second frame guide 206b.

The position of the lowest part of the slope surfaces of each frame guide is adjusted to the length of the longer and shorter side of the frame 102, and the dimensional tolerance is determined so as not to cause position deviation when the resin-sealed lead frame 10 is put on, and therefore when the frame 102 reaches the principal surface of the break table 20, positioning of the resin-sealed lead frame 10 is already complete. That is, the runner 104 and gate 105 of the resin-sealed lead frame 10 are positioned in the notch groove for runner 201a and notch groove or gate 201b of the break table 20, respectively.

Consequently, the break unit 30 descends, and the suction pad for package 304 and suction pad for cull 305 contact with the semiconductor package 101 and cull 103, respectively. At this time, however, vacuum suction is not done, but merely the suction ports 304S and 305S are contacting. In this way, the suction pad for package 304 and suction pad for cull 305 contact with the semiconductor package 101 and cull 103, which is intended to restrict the position of the resin-sealed lead frame 10 in order to prevent position deviation of the resin-sealed lead frame 10 in the next gate break step. The restriction of position of the resin-sealed lead frame 10 is also achieved by the frame holder 306 explained later.

Next, as shown in FIG. 7, as the break pin fitting plate 302 of the break unit 30 descends, the break pin 301 goes down, and its front end reaches the break region BP of the frame 102, and the frame 102 pushes down the resin surface exposed on the surface to peel the gate 105 from the frame 102, and also the runner 104 is peeled.

Herein, since the break pins 301 are designed to be longer at a position further from the cull 103, the remotest one from the cull 103 first pushes down the resin surface. In this case, the portion of the cull 103 is slightly lifted, but since the vacuum tube 305T of the suction pad for cull 305 is flexible in the tube longitudinal direction, the upward force due to lifting of the cull 103 is absorbed.

If the vacuum tube 305T of the suction pad for cull 305 is not flexible, the cull 103 is pushed in the downward direction by the reaction of the upward force of the lifted cull 103, and the portion of the cull 103 may be broken, or the gate 105 at the closer side to the cull 103 may be peeled halfway, leaving the gate 105 partly.

As the break pin 301 further descends, all gates 105 and runners 104 are peeled, and drop together with the cull 103, pass through the notch 201c from the notch groove for runner 201a and notch groove for gate 201b, and further pass through the base table 240, and are put into a container not shown. As a result, on the major surface of the break table 20, the frame 102 and semiconductor package 101 are leftover.

Figure 8:
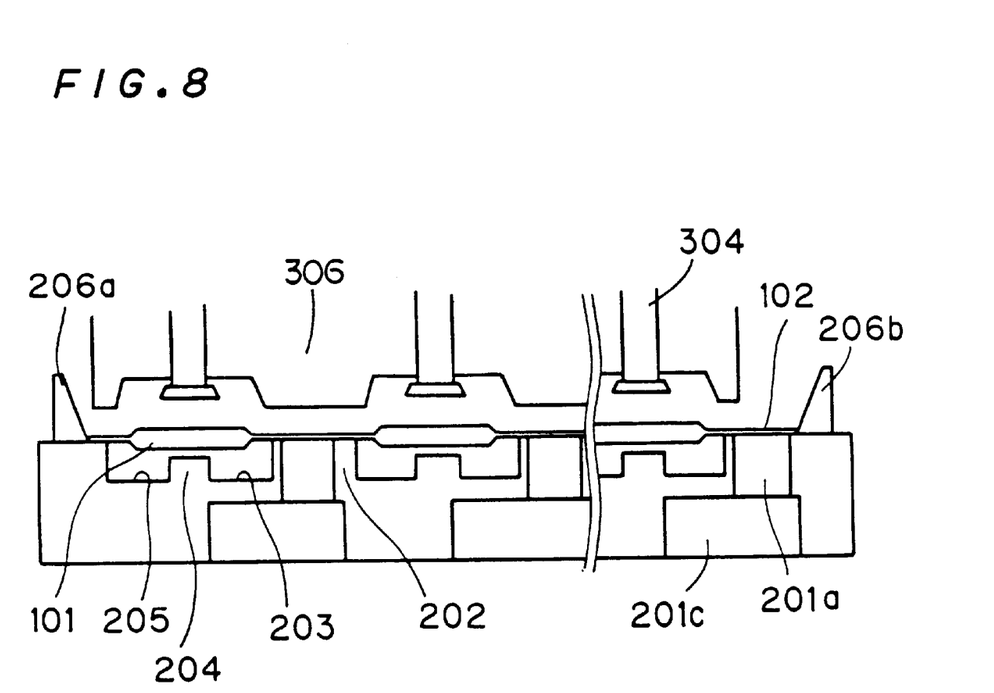
FIG. 8 is a diagram showing a constitution of a frame holder of a gate break device of the invention.

Herein, the function of the frame holder 306 is explained. FIG. 8 shows a partial magnified view of the frame holder 306 and break table 20 as seen from the opposite longer side direction of the disposed side of the cull 103 of the resin-sealed lead frame 10. The runners 104 and gates 105 are omitted.

In FIG. 8, as explained earlier, since the height of the second convex portion 204 of the break table 20 is lower than the first convex portion 202, the major surface of the semiconductor package 101 does not contact with the second convex portion 204. The frame holder 306 has plural grooves 306a for covering the semiconductor package 101 in an area corresponding to the semiconductor package 101, and convex portions 306b are formed between grooves. The grooves 306a have suction pads for package 304, and when the suction pads for package 305 contact with the major surface of the semiconductor package 101, the convex portions 306b contacts with the major surface of the frame 102 to pinch the frame 102 together with the major surface (first convex portion 202, etc.) of the break table 20, thereby restricting the position of the frame 102. Therefore, the resin-sealed lead frame 10 is prevented from moving in the midst of the gate break step to cause the semiconductor package 101 to contact and break any break table 20.

Incidentally, the break table 20 shown in FIG. 4 has the second convex portion 204, but this is only intended to limit the bend of the frame 102, and the second convex portion 204 is not absolutely necessary, and the first concave portion 203 and second concave portion 205 may be consecutive.

Finally, sucking again the semiconductor package 101, it is lifted together with the frame 102, and moved from above the major surface of the break table 20, thereby finishing the gate break step.

<E. Modified example of resin-sealed lead frame>

The resin-sealed lead frame explained in FIG. 1 has break regions BP exposing resin in a circular form on the surface of the frame 102, but the plan view shape of the break regions BP is not limited to circular form, but may be, for example, square if allowing to pass the break pins 301.

Figure 9:
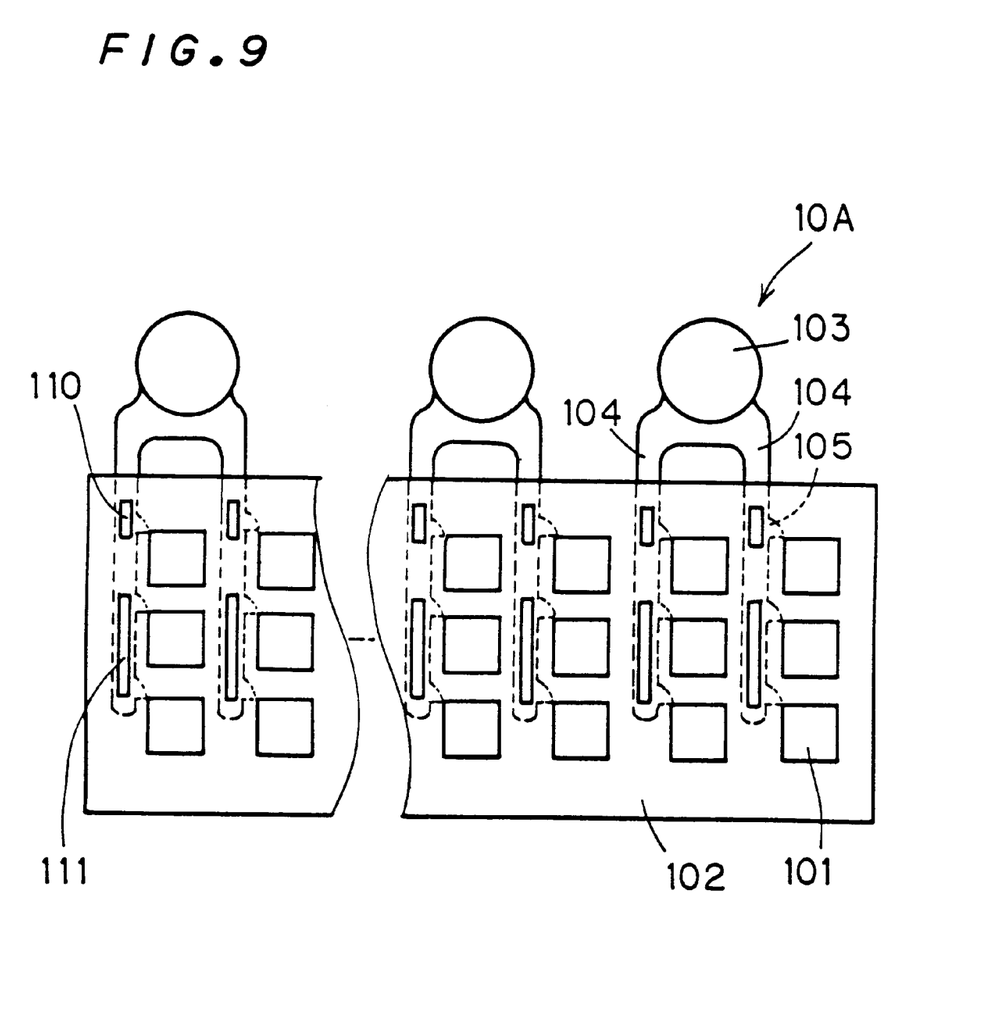
FIG. 9 is a diagram showing other constitution of a resin-sealed lead frame suited to a gate break device of the invention.

FIG. 9 shows an example of square shape of break regions BP. In FIG. 9, a first break region 110 is formed in a square shape above the runner 104 near the gate 105 closest to the cull 103, and a second break region 11 is formed in a square shape over the runner 104 near two consecutive gates 105.

In the break regions of such shape, the columnar break pins such as break pins 301 of the break unit 30 explained in FIG. 2 may be used, but also square break pins matching with the plane view shape of the first break region 110 and second break region 111 may be used.

In the resin-sealed lead frame 10, three gates 105 extend each from one runner 104, and the semiconductor packages 101 are connected to the ends of the gates 105, but the number of gates 104 and the number of semiconductor packages 101 are not limited to these figures.

In this case, by varying the number of suction pads of the break unit, the number of break pins, the pin diameter, and the shape of the break table depending on the resin-sealed lead frame, that is, according to the variety of products, it may be applicable to multiple types of gate breaks.

While the invention has been shown and described in detail, the foregoing description is in all aspects illustrative and not restrictive. It is therefore understood that numerous modifications and variations can be devised without departing from the scope of the invention.

We claim:

1. A gate break device for breaking connection of resin members provided in a resin-sealed lead frame, wherein said resin-sealed lead frame has a lead frame and semiconductor devices provided on said lead frame, said resin members include package portions for sealing said semiconductor device with resin and extra portions formed together with said package portions under said lead frame, said extra portions include gates connected to said package portions under said lead frame and runners connected to said gates under said lead frame, said gate break device comprising:

a break table for accepting said resin-sealed lead frame on said break table; and a break unit for breaking connections between said package portions and said extra portions, wherein said break unit has runner push-down means for pushing down said runners, vacuum suction means for sucking in a vacuum said resin-sealed lead frame, and moving means for moving said runner push-down means and said vacuum suction means in horizontal and vertical directions, and wherein said break table has a plurality of frame guides each having a slope surface configured to provide an opening at tip portions of said plurality of frame guides distanced vertically from the break table, said opening having dimensions larger than corresponding dimensions of an external configuration of said resin-sealed lead frame to accept said resin-sealed lead frame into said opening, and notch grooves are formed through said break table and having shapes corresponding to shapes of said extra portions of said resin members.

2. The gate break device of claim 1, wherein said vacuum suction means has first suction means for sucking in vacuum said culls, and second suction means for sucking in vacuum said package portions.

3. The gate break device of claim 2, wherein said first suction means has a flexible vacuum exhaust tube.

4. The gate break device of claim 1, wherein said break unit further has a frame holder for pushing said lead frame toward said break table to restrict said resin-sealed lead frame in position, and said break table further has recesses for accepting said package portions without touching said package portions.

5. The gate break device of claim 1, wherein said lead frame has circular holes, said runners have portions exposed upward through said holes, and said runner push-down means has push-down pins for pushing down said portions of said runners exposed.

6. The gate break device of claim 1, wherein said lead frame has rectangular holes, said runners have portions exposed upward through said holes, and said runner push-down means has push-down pins for pushing down said portions of said runners exposed.

7. A method of breaking connection of resin members provided in a resin-sealed lead fame with a gate break device, wherein said resin-sealed lead frame has a lead frame and semiconductor devices provided on said lead frame, said resin members include package portions for sealing said semiconductor devices with resin and extra portions formed together with said package portions under said lead frame, said extra portions include gates connected to said package portions under said lead frame and runners connected to said gates under said lead frame, said gate break device comprises a break table for accepting said resin-sealed lead frame on said break table and a break unit for breaking connections between said package portions and said extra portions, and wherein said break table has a plurality of frame guides each having a slope surface configured to provide an opening at tip portions of said plurality of frame aides distanced vertically from the break table, said opening having dimensions larger than corresponding dimensions of an external configuration of said resin-sealed lead frame to accept said resin-sealed lead frame into said opening, and notch grooves are formed through said break table and having shapes corresponding to shapes of said extra portions of said resin members, said method comprising the steps of:

(a) sucking said resin-sealed lead frame with vacuum suction means and moving said resin-sealed lead frame to said opening;

(b) releasing said resin-sealed lead frame from said vacuum suction means onto said slope surfaces of said break table which position the resin-sealed lead frame on said break table;

(c) moving said vacuum suction means onto said resin-sealed lead frame; and (d) pushing down said runners to break connections between said gates and said package portions, whereby said gates and said runners fall down through said notch grooves.

* * * * *